United States Patent Office 3,284,691
Patented Nov. 8, 1966

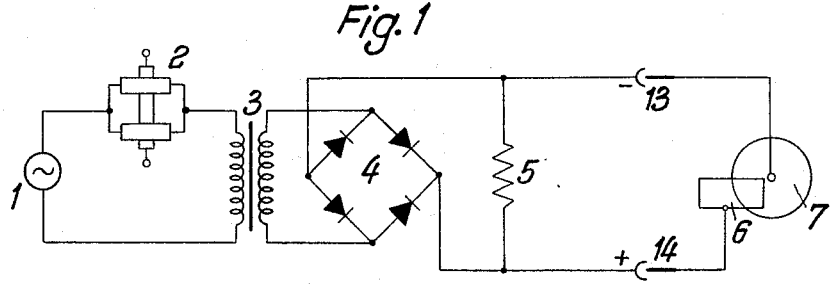
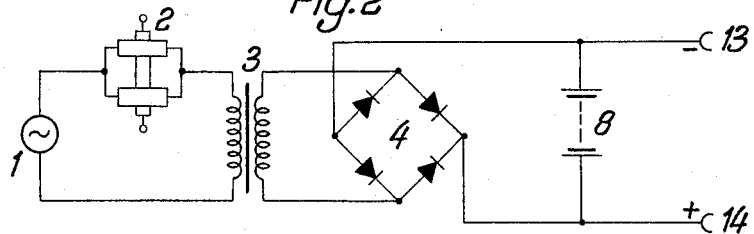
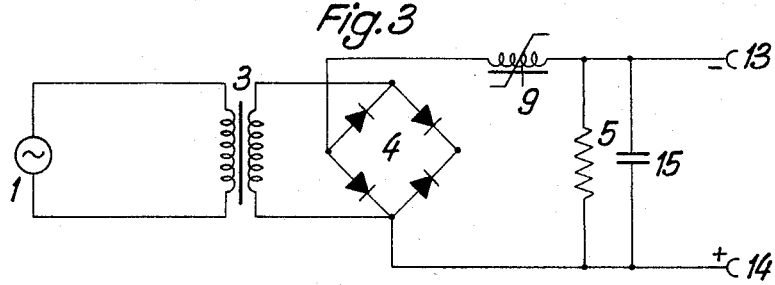
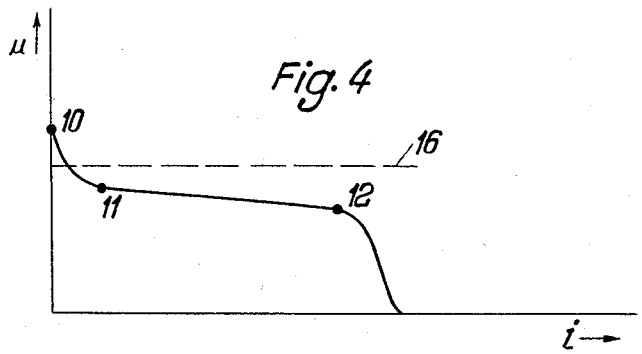

3,284,691
CIRCUIT ARRANGEMENT FOR THE ELECTRIC GENERATOR REQUIRED FOR THE ELECTROLYTIC MACHINING OF METALLIC CONDUCTING MATERIALS
Hans J. Schulz, Wuppertal-Vohwinkel, and Hans Schierholt, Aachen, Germany, assignors to Deutsche Edelstahlwerke Aktiengesellschaft, Krefeld, and Allgemeine Elektricitats-Gesellschaft, Berlin-Grunewald, Germany
Filed Sept. 5, 1961, Ser. No. 136,057
Claims priority, application Germany, Sept. 9, 1960, D 34,231
2 Claims. (Cl. 321—16)

The invention relates to a circuit arrangement for the electric generator required for the electrolytic machining of metallic conducting materials, particularly for electrolytic grinding. Such generators are required to provide a relatively low direct voltage and a high current. For the purposes of electrolytic grinding the terminals of the generator are connected with the metallic, possibly metal-bonded diamond grinding wheel of a grinding machine of conventional construction and with the work that is to be ground. An electrolyte is introduced between the grinding wheel and the work and, provided the polarity of the current is correct, the electrolytic effect of the current wears away the surface of the work.

For ensuring satisfactory work and for protecting the expensive grinding wheels it is a matter of considerable importance to provide means for suppressing the generation of sparks and arcs. Proposals have already been made which aim at providing return connections in the generator for suppressing the generation of arcs and sparks by preventing the voltage between work and electrode from rising beyond a level at which arcing would begin. Known methods and devices for this purpose make use of the high frequency current component which arises when a spark or arc is formed. For a control means of this kind it has been proposed to tap the high frequency current component from the working circuit and to feed it through suitable amplifiers to the rectifier for reducing the voltage between tool and work electrode as soon as a high frequency A.C. component is generated by an arc or a spark.

In order to suppress an arc or spark in nascendi a further development of the above described device has been proposed whereby the control means are already activated when the working current rises beyond a predetermined level, so that the current will be maintained at this value within narrow limits or controlled down to an appropriate value below this constant level. The control means in this proposal comprise an electric amplifier of which the input is connected with a resistor in the working circuit and the output with a transductor incorporated in the circuit on the mains side thereof.

According to a hitherto unpublished proposal the signal used for controlling the output voltage is an electric controlling quantity containing the first derivative of the output current with respect to time.

Although these known devices suppress arcing and sparking fairly effectively, they nevertheless have the drawback of being costly because of the relatively high expenditure in apparatus which must be provided. Moreover, the complexity of the amplifying means introduces a considerable number of additional sources of possible trouble.

It must also be borne in mind that in electrolytic grinding machines which are usually controlled by hand the undesirable generation of arcs is principally due to sudden changes in the engagement of the working surfaces between the electrodes, especially when grinding begins. For instance, charred or broken tools which are about to be reground have sharp edges and projections. Furthermore, in known control means favourable condition for arcing are created by continuous fluctuations of contact pressure. Changes in the working surface and changes in contact pressure necessarily considerably vary the load which may fluctuate between no load and full load.

The present invention proposes a simple circuit for generators of the specified kind which, through of simple construction, effectively suppresses arcing due to voltage surges under no load conditions. The circuit according to the invention which includes a rectifier joined to a source of A.C. is characterised by the provision in a manner known per se of a preferably current limiting non-liear resistance in the D.C. or A.C. circuit and by a voltage limiting means on the D.C. side placed across the terminals for electrode and work. The voltage limiting means and the non-linear resistance are matched to ensure that a major voltage surge under no load conditions exceeding the normal voltage range is suppressed.

In a particularly simple embodiment the voltage limiting element which bridges the terminals is an ohmic resistor which prevents a voltage rise under no lead conditions, and which provides a load across the rectifier in the no-load range determined by the non-linear resistor in such a way that the voltage in the working range remains below the level at which arcing begins. This prevents the voltage rising at no-load and since the working voltage always remains below arcing level, an arc can not develop.

In an alternative embodiment the current limiting element for bridging the rectifier may be a buffering battery, preferably an accumulator having a high capacity and a low number of ampere-hours and generating a voltage which is less than the voltage at which arcing begins.

If the non-linear resistance is incorporated in the D.C. or working circuit, then an inductance coil with an air gap and a ferromagnetic core may be used with a reactive resistance which by utilising the air gap is variable within a wide loading range. If it is desired to include the nonlinear resistor in the A.C. circuit, then a mangetically biased inductance coil, for instance in the form of a transductor, may be used as a current limiting device.

The subject matter of the invention and the manner in which it functions will now be described by reference to the schematic drawings in which FIGS. 1 to 3 represent different circuit schemes according to the invention, and FIG. 4 is a graph representing the current-voltage characteristic of the circuit according to FIG. 1.

In the circuit shown in FIG. 1 the A.C. source 1 is connected with a rectifier 4 via a transductor 2 and a transformer 3. The transductor 2 which in the A.C. circuit of the rectifier works as a current-limiting non-linear resistor generally consists of one or more saturable inductance coils with ferromagnetic cores, the reactive resistance of said coils being controllable by an independent current. The D.C. side of the rectifier 4 is bridged by an ohmic resistor 5 between the terminals 13 and 14. The correct polarity terminals are connected with the work 6 and the grinding wheel 7. The general shape of the current-voltage characteristic of the generator illustrated in FIG. 1 is represented in FIG. 4. Whereas in the range 11–12 the voltage varies but little with varying loads, a more pronounced effect on voltage must be expected to occur in the no-load region between points 10 and 11 when the generator is not under load. The value of the resistor is now arranged to be such that the current which it draws from rectifier 4 corresponds with point 11 of the characteristic current-voltage curve. Consequently the voltage rise at no load, when the generator is in operation, will remain below the level at which arcing begins even when the load falls to zero. The voltage at which arcing begins is indicated in the chart by a dotted line 16.

FIG. 2 illustrates the principle of a circuit in which the voltage-limiting element is a buffering battery 8, preferably an accumulator, connected in parallel with rectifier 4, said battery having a large capacity but a low number of ampere hours, and its voltage under no load or when discharging being less than the voltage at which arcing begins.

In FIG. 3 the non-linear resistor is an inductance coil 9 with an air gap and a ferro-magnetic core included in the D.C. circuit. Parallel with the output terminals behind inductance coil 9 is the voltage-limiting ohmic resistor 5. The inductance coil 9 should be suitably designed to have maximum reactance when the generator is under no load, in order to prevent the current when the load falls and hence the voltage across terminals 13, 14 from pulsating too strongly. On the other hand, the reactance of the coil cannot be arbitrarily selected to prevent excessive voltage dependence in the working range. The combination of this inductance coil with resistor 5 and a smoothing capacitor 15 connected in parallel with this resistor produces a current-voltage characteristic in which analogously as in FIG. 4, the current drawn from the rectifier under no-load is such as to suppress the steeper voltage rise in the no-load region 10–11 in relation to the working range 11–12.

What we claim is:

1. In an electrolytic machining apparatus for electrolytically machining metallic conducting materials, a circuit arrangement comprising an A.C. source and an A.C. circuit supplied thereby, a rectifier connected to said circuit and a D.C. circuit connected to said rectifier for circuiting an electrode and a workpiece providing a working gap, a current-limiting non-linear resistance in one of said circuits and a voltage-limiting element across the said D.C. circuit, said element and the said non-linear resistance being matched in such manner that a major voltage rise beyond the normal working range under no-load conditions will be suppressed, and in which the said voltage-limiting element is a buffering battery with a low capacity in ampere-hours and which has a no-load discharging voltage smaller than the voltage at which arcing takes place.

2. In an electrolytic machining apparatus for electrolytically machining metallic conducting materials, a circuit arrangement comprising an A.C. source and an A.C. circuit supplied thereby, a rectifier connected to said circuit and a D.C. circuit connected to said rectifier for circuiting an electrode and a workpiece providing a working gap, a current-limiting non-linear resistance in one of said circuits and a voltage-limiting element across the said D.C. circuit, said element and the said non-linear resistance being matched in such manner that a major voltage rise beyond the normal working range under no-load conditions will be suppressed, and in which the said non-linear resistance is an air-gapped reactance coil with a ferromagnetic core placed in the said D.C. circuit.

References Cited by the Examiner

UNITED STATES PATENTS

| | | | |
|---|---|---|---|
| 1,620,519 | 3/1927 | Clawson | 204—143 |
| 2,423,134 | 7/1947 | Winkler | 321—25 |
| 2,660,702 | 11/1953 | Arvidsson | 321—16 |
| 2,694,178 | 11/1954 | Smith | 321—25 |
| 2,793,992 | 5/1957 | Heuser | 204—143 |
| 2,924,751 | 2/1960 | Inoue | 204—224 |
| 2,950,239 | 8/1960 | Williams | 204—224 X |
| 3,004,910 | 10/1961 | Keeleric | 204—143 X |
| 3,109,086 | 10/1963 | Cole | 204—143 X |

FOREIGN PATENTS

| | | |
|---|---|---|
| 1,266,759 | 6/1961 | France. |
| 770,998 | 3/1957 | Great Britain. |

JOHN F. COUCH, *Primary Examiner.*

ROBERT C. SIMS, LLOYD McCOLLUM, *Examiners.*

G. J. BUDOCK, G. GOLDBERG, *Assistant Examiners.*